Dec. 23, 1969  J. V. DAVIS  3,485,026
HARVESTER APPARATUS
Filed Dec. 29, 1966  6 Sheets-Sheet 4
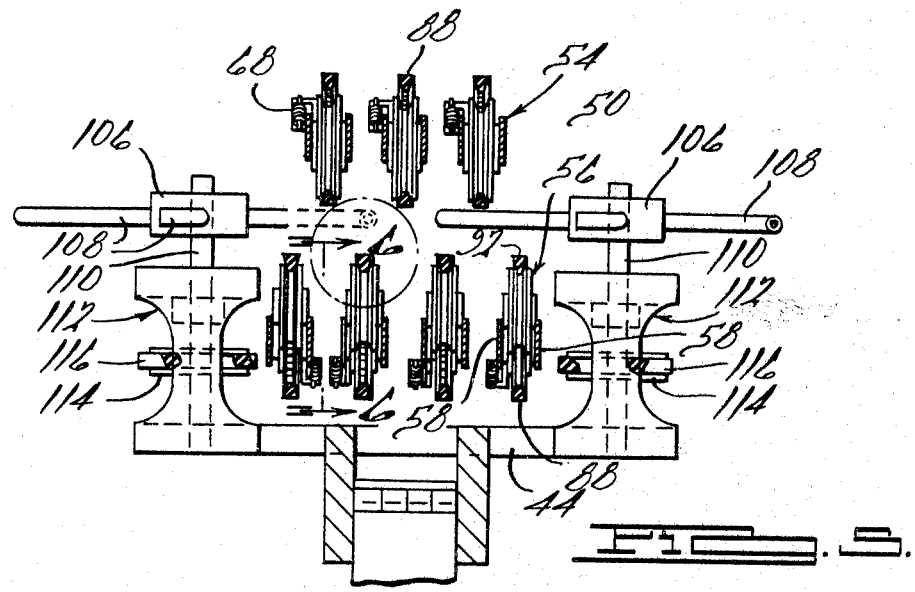
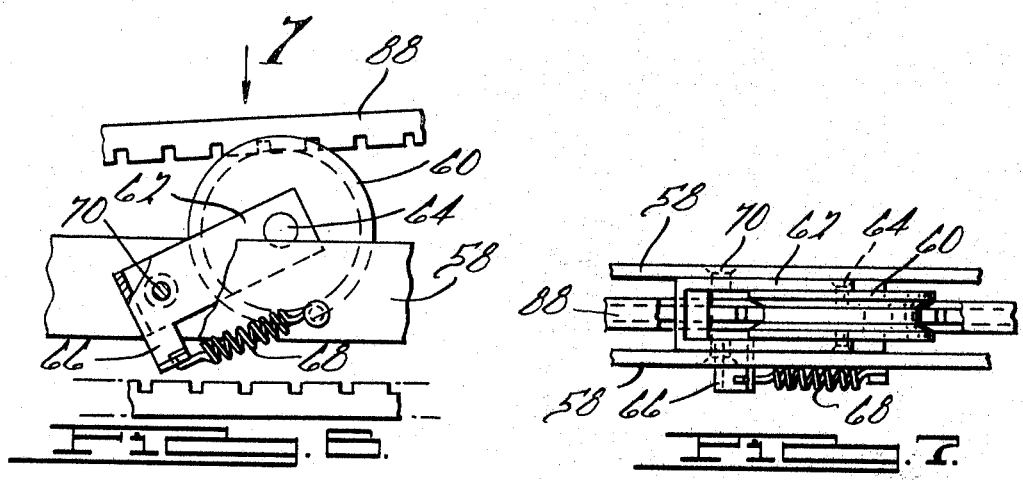
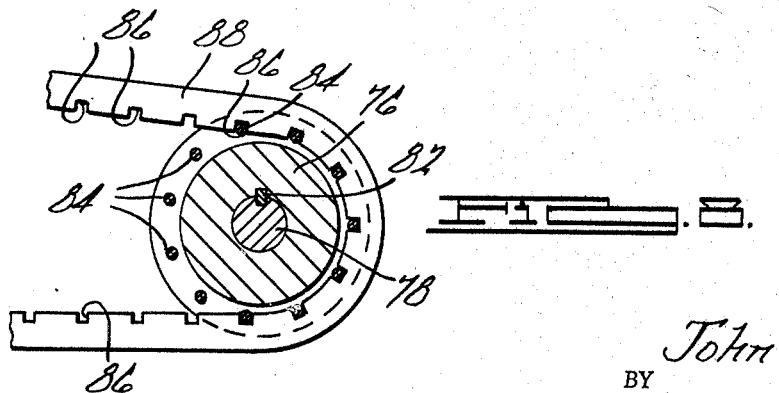
INVENTOR.
John V. Davis
BY
Harness, Dickey & Pierce
ATTORNEYS.

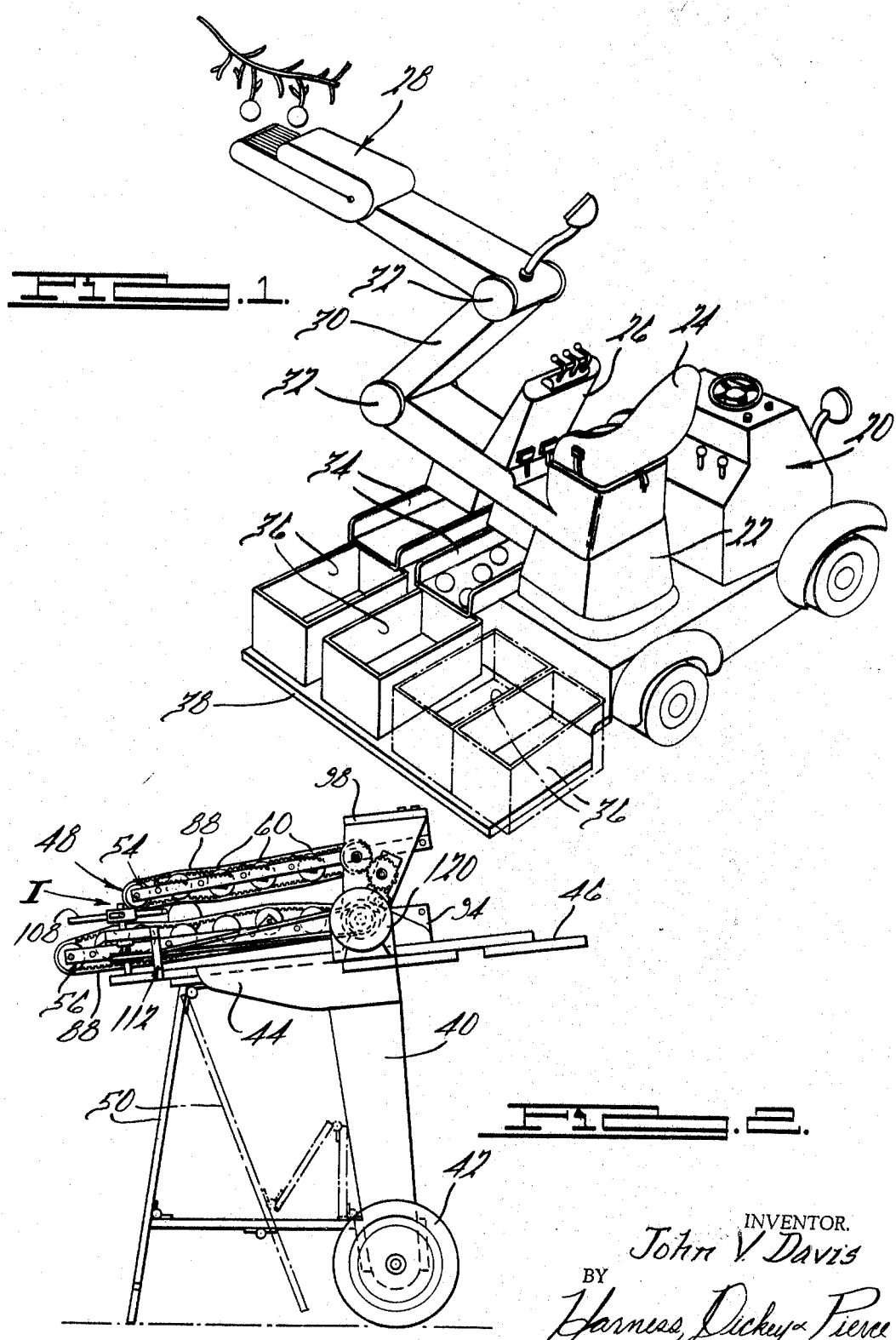

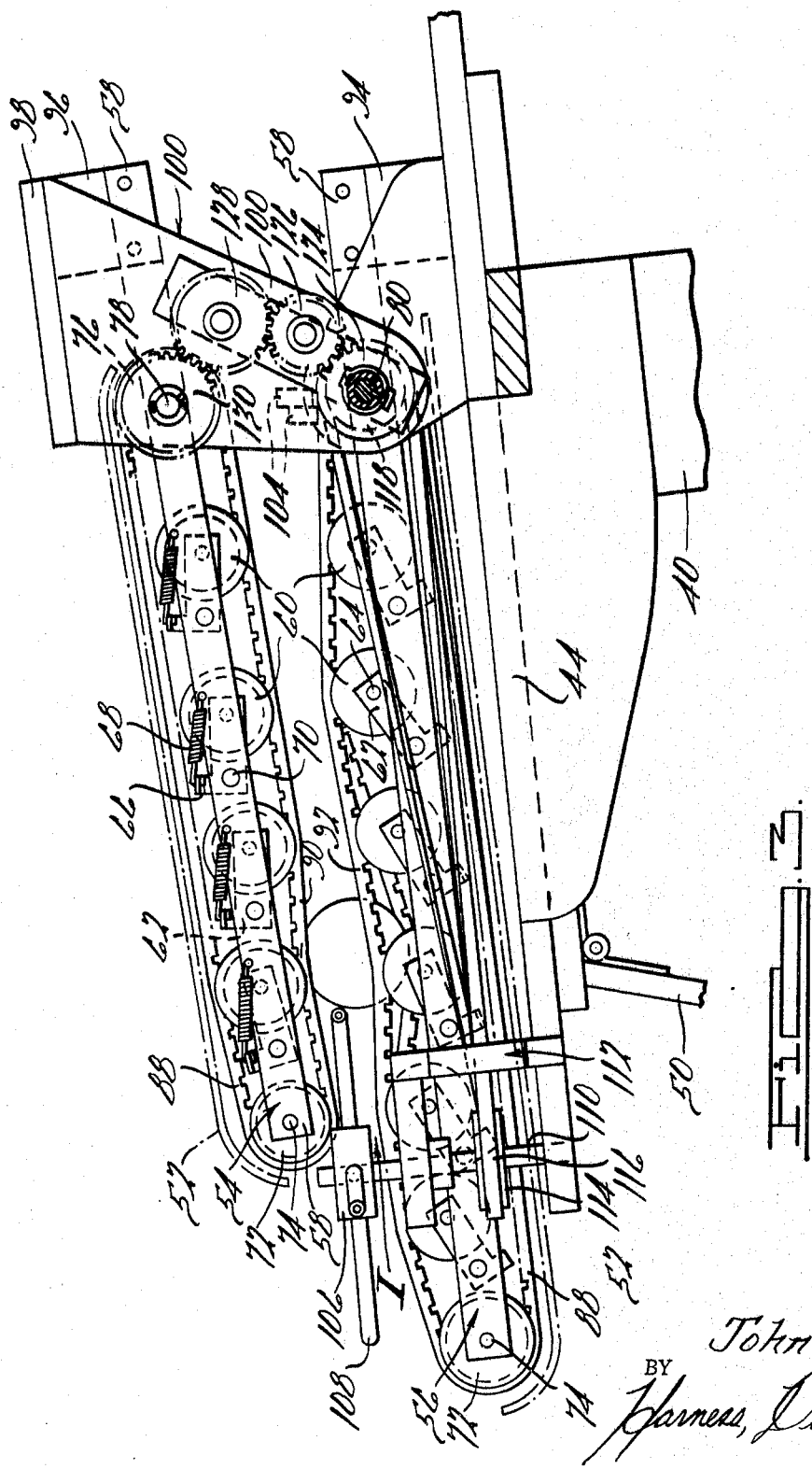

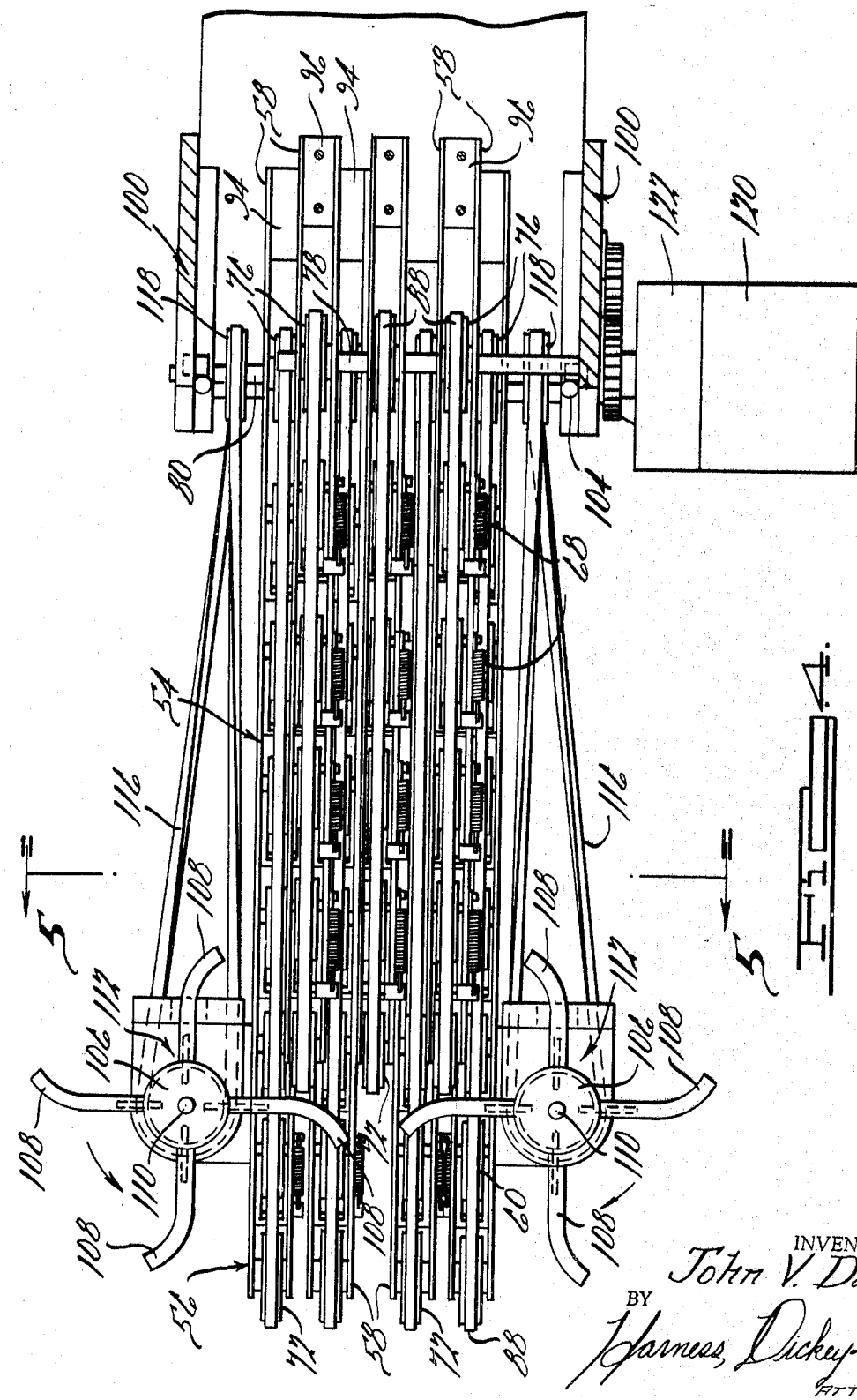

Dec. 23, 1969   J. V. DAVIS   3,485,026
HARVESTER APPARATUS
Filed Dec. 29, 1966   6 Sheets-Sheet 5

INVENTOR.
John V. Davis
BY
Harness, Dickey & Pierce
ATTORNEYS

INVENTOR.
John V. Davis
BY
Harness, Dickey & Pierce
ATTORNEYS

United States Patent Office 3,485,026
Patented Dec. 23, 1969

3,485,026
HARVESTER APPARATUS
John V. Davis, 42 Moross Road, Grosse Pointe
Farms, Mich. 48236
Filed Dec. 29, 1966, Ser. No. 605,664
Int. Cl. A01g *19/04*
U.S. Cl. 56—328                                10 Claims

ABSTRACT OF THE DISCLOSURE

A fruit harvesting apparatus having a picking head incorporating a plurality of continuous flexible belts disposed with the longitudinally extending flights thereof in spaced, opposed and laterally offset relationship. The belts are driven such that the flights travel at different linear speeds to effect an engagement of rounded fruit between opposed flights and thereby imparting a composite linear and rotary movement to the fruit to effect disengagement thereof from its stem and conveyance to a suitable receptacle.

BACKGROUND OF THE INVENTION

An important and increasing problem facing the agricultural industry is the harvesting of various crops, and particularly fruit crops, in an efficient and economical manner without encountering damage to the crop. For the most part, haresting of fruit crops, and particularly citrus fruits, has been accomplished in the past by manual labor. Labor shortages and higher wages scales have occasioned a significant increase in the difficulty and cost of harvesting such crops with a corresponding increase in the cost of the produce to the consumer. Various mechanized picking devices have heretofore been used or proposed for use which have been found deficient in one or more respects and have been discarded in favor of conventional manual picking techniques. Apparatuses of the foregoing type include shaking devices for shaking a tree or plant so as to dislodge the fruit therefrom; air-blowing devices which are adapted to direct high velocity air currents against a tree or plant, also to effect a dislodgement of the fruit therefrom; and various screw-type and belt-type conveyor systems which are adapted to be manipulated so as to come into engagement with the fruit, effecting stripping of the fruit from its stem. In some instances, the size and cumbersome nature of such mechanized pickers has prevented efficient picking, while in other instances, these apparatuses have occasioned severe damage to either the plant or the crop being harvested, rendering them useless for their intended purpose.

SUMMARY OF THE INVENTION

It is a principal object of the present invention to provide an improved harvesting apparatus which is particularly applicable for harvesting citrus fruits, and which overcomes the disadvantages of mechanized harvesting devices of the types heretofore known. The haresting apparatus comprising the present invention includes a picking head assembly which is adapted to be mounted on a suitable frame work, which is operative to manipulate the picking head so as to position it adjacent to fruit to be harvested, effecting an engagement of the fruit and a movement thereof in a manner so that it is disengaged from its stem without occasioning any damage to the fruit itself or to the plant or tree on which the fruit is grown. The picking head assembly comprises a pair of spaced-apart overlying frames, each incorporating a plurality of endless belts extending longitudinally thereof, and arranged with the flights of each of the belts disposed in spaced, substantially parallel relationship and with the opposing flights on one frame laterally offset with respect to the opposing flights on the other frame. The triangular spacing of the flights, as viewed in a direction trarsverse to the direction thereof, form channels within which the fruit is engaged and conveyed and subsequently discharged into suitable receptacles. Suitable drive means are provided for effecting movement of each of the flights in the same direction inwardly from the forward ends of the frames, and wherein the flights on one frame travel at a linear speed different than that of the speed of travel of the opposing flights, whereby a composite linear and rotary movement is imparted to the fruit, which is effective to cause dislodgement thereof from the plant. The picking head assembly is preferably further provided with suitable feed means for engaging fruit and advancing it toward the inlet end of the picking head assembly, facilitating thereby the engagement of fruit. It is further contemplated, in accordance with one practice of the present invention, that alternate ones of the flights on each frame travel at linear speeds different from that of the adjacent flights and the opposing flights on the opposite frame such that rotation of the fruit occurs about a plurality of axes simulating the movement of the fruit during a manual picking operation, and thereby further facilitating disengagement of the fruit from the plant.

Others objects and advantages of the present invention will become apparent upon a reading of the following description taken in conjunction with the accompanying drawings.

BRIEF DESCRIPTION OF THE DRAWINGS

FIGURE 1 is a perspective view of a mobile harvesting apparatus incorporating a picking head assembly constructed in accordance with the preferred embodiments of the present invention;

FIGURE 2 is a side elevational view of an alternative satisfactory harvesting apparatus in which the picking head assembly is supported on a manually transportable framework;

FIGURE 3 is an enlarged fragmentary side elevational view of the picking head assembly of the harvesting apparatus shown in FIGURE 2;

FIGURE 4 is a fragmentary plan view of the picking head assembly illustrated in FIGURE 3;

FIGURE 5 is a transverse sectional view of the picking head shown in FIGURE 4, and taken substantially along the line 5—5 thereof;

FIGURE 6 is an enlarged fragmentary sectional view of a support pulley shown in FIGURE 5, and taken substantially along the line 6—6 thereof;

FIGURE 7 is a fragmentary plan view of the support pulley shown in FIGURE 6, as viewed in the direction of the arrow indicated at 7;

FIGURE 8 is a fragmentary side elevational view of a drive pulley engaged by a continuous belt;

DESCRIPTION OF THE PREFERRED EMBODIMENTS

Figure 9:
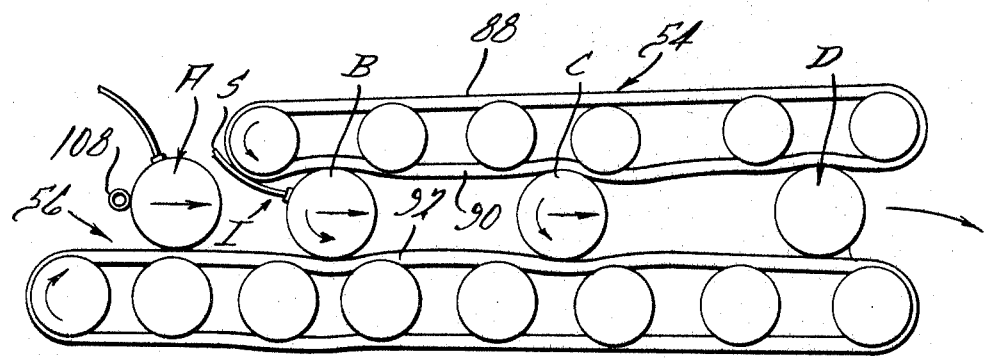
FIGURE 9 is a schematic side elevational view illustrating the movement of a rounded piece of fruit along the flights of the belts on a picking head.

Referring now in detail to the drawings, and as best illustrated in FIGURE 1, a typical harvesting device incorporating the preferred embodiments of the present invention, and which provides for optimum mobility of the picking head assembly, comprises a suitable mobile platform or vehicle 20, which is of a size to enable free access along the rows of the trees in citrus groves or apple orchards. An operator is adapted to be seated on a rotatable pedestal 22 mounted on the bed of a vehicle including a seat 24 in front of which a control panel 26 is mounted for effecting controlled movement of a picking head assembly 28 mounted on the end of an articulated boom 30. The boom 30 is hinged at 32 to enable extension and retraction, as well as elevation, of the picking head 28 to a position contiguous to the fruit to be harvested. The fruit, upon being engaged by the picking head, passes inwardly thereof and then downwardly through a suitable chute within the articulated boom 30 and passes outwardly through chutes 34, which effect a grading of the fruit with respect to size, and the fruit is thereafter discharged into crates 36 supported on a rearwardly extending ramp 38 affixed to the vehicle 20. The mechanized arrangement of the harvesting apparatus, as illustrated in FIGURE 1, enables the entire fruit crop to be harvested by a single operator with only a minimum of movement of the vehicle to gain access to all of the fruit on a tree.

The picking head assembly comprising the present invention is also applicable to manually transportable harvesting devices of the type illustrated in FIGURE 2, which is particularly applicable for harvesting fruit from the lower branches of a tree. As shown in FIGURE 2, the harvesting device comprises a supporting frame including legs 40, on which wheels 42 are rotatably supported. The legs 40 are connected at their upper ends to a platform 44 provided with rearwardly-extending handles 46, which are adapted to be held by an operator for transporting and manipulating the picking head assembly 48 to a position contiguous to fruit to be harvested. A collapsible leg 50 is hingedly connected to the forward end of the platform 44 for maintaining the harvesting device in an upright position during periods of non-use. It will be appreciated that the picking head assemblies comprising the present invention can be mounted on alternative suitable supporting devices to effect transportation and manipulation thereof to a position contiguous to fruit to be harvested. In either event, the elements of the picking head and the operation thereof are substantially identical, providing for improved efficiency in the picking of fruit without effecting damage to either the plant or fruit being harvested.

The structural features of the picking head assembly 48 of the harvesting device illustrated in FIGURE 2 will now be described in detail with particular reference to FIGURES 3–8. For the purposes of clarity, shrouds 52, as shown in phantom in FIGURE 3, which overlie the upper surface of an upper or first frame 54 and the undersurface of a second or lower frame 56, have been omitted from the remaining drawings to reveal the operating components enclosed therein. The shrouds 52 provide a protective casing over the upper and lower inactive surfaces of the picking head assembly, avoiding thereby the entry of any leaves, branches, or other extraneous matter, into the operating mechanism enclosed thereby.

As best seen in FIGURES 3–8, the upper frame 54 and the lower frame 56 comprise a plurality of pairs of longitudinally-extending rigid bars 58, between which a plurality of support pulleys 60 are rotatably mounted between the end portions of U-shaped straps 62 by means of axles or pins 64. Each U-shaped strap 62 incorporates an offset leg 66, to which one end of a coil spring 68 is attached, having the other end thereof removably secured to the adjacent bar 58, tending to pivotally bias the U-shaped strap and the support pulley thereon about a pivot pin 70 extending between and affixed to each pair of bars 58, as best seen in FIGURES 6 and 7. An idler pulley 72, as best seen in FIGURE 3, is rotatably supported at the forward end of each pair of bars 58 by means of a shaft 74. A drive pulley 76 is affixed to the rearward end or right-hand side of each pair of bars 58, as viewed in FIGURE 3. The upper drive pulley 76 of the first frame is affixed to a drive shaft 78, while the drive pulley 76 on the lower or second frame is secured to a drive shaft 80. The drive shafts 78 and 80 extend across the entire width of the upper and lower frames and each of the drive pulleys are removably secured thereto such as by means of a key 82, as illustrated in FIGURE 8. The drive pulleys 76 are preferably provided with a series of cogs or pins 84 disposed at circumferentially-spaced intervals, which are adapted to engage suitable transverse notches 86 of a flexible V-belt 88, which extends in a continuous manner around each drive pulley and is guided by the support pulleys 60 and finally around the idler pulleys 72 at the forward ends of the first and second frame.

In accordance with this arrangement, the upper frame 54 comprises a plurality of longitudinally-extending belts 88 disposed in spaced, substantially parallel relationship, and wherein the lower flights 90, as viewed in FIGURES 3 and 5, are disposed in opposing relationship with respect to the upper opposing flights 92 of the belts on the lower or second frame 56. It will be further noted that the flights 90 and 92 are laterally offset from each other defining a plurality of channels as defined by the triangularly-oriented flights, as viewed in FIGURE 5, which are adapted to engage rounded fruit at three points of contact and move the fruit inwardly in a manner subsequently to be described. It will be further noted in FIGURE 3 that the support pulleys 60 on the upper frame 54 are biased downwardly while the support pulleys on the lower frame 56 are biased upwardly so as to move the opposing flights 90 and 92 toward each other to maintain frictional engagement of a piece of fruit therebetween during all moved positions thereof. The relative flexing of the pulleys in response to the travel of a rounded piece of fruit is illustrated in FIGURE 3. The opposing bias applied to the opposing flights 90 and 92 also assures adequate frictional engagement of a rounded piece of fruit at such times when two or more pieces of fruit are engaged by the same flights and are spaced from each other during their conveyance toward the right and as viewed in FIGURE 3.

The pairs of bars 58 of the lower frame 56 extend rearwardly or to the right as viewed in FIGURES 3 and 4, and are securely fastened to upstanding brackets 94 affixed to and projecting upwardly of the frame or platform 44. The first or upper frame 54 similarly is mounted at the ends of the pairs of bars 58, which are affixed to downwardly-extending brackets 96, which are secured to the bight portion 98 of an inverted U-shaped framework 100. The side legs 102 of the U-shaped framework 100 are pivotally secured about the lower drive shaft 80, enabling relative pivoting movement of the upper frame relative to the lower frame, providing for controlled variations between the spacing of the flights on opposed surfaces thereof to accommodate fruits of different diameters. Relative pivoting movement of the upper frame with respect to the lower frame beyond undesirable increments is prevented by coacting stops 104, as best seen in FIGURES 3 and 4, which prevent downward tilting movement of the upper frame beyond a preselected position to assure the maintenance of a minimum space or gap between its forward end and that of the opposed flights on the lower frame.

In accordance with a preferred construction of the picker head comprising the present invention, the forward end or left-hand side, as viewed in FIGURE 3, of the lower frame 56 projects substantially beyond the forward end of the upper frame 54, forming a loading area or platform on which fruit to be picked can be supported until it is engaged by the flights of the upper and lower frames. The inlet of the picker head is defined by the transverse area extending between the idler pulleys 72 on the upper frame 54 and the upper surface of the opposing flights 92 on the lower frame. This inlet area has been designated by the letter I in FIGURES 2 and 3.

To facilitate movement of fruit from a position contiguous to the forward ends of the upper and lower frames of the picking head to a position where the fruit passes into the inlet I and is engaged by the inwardly moving opposed flights, suitable feed devices are preferably incorporated at a point adjacent to the inlet for engaging and advancing the fruit toward the inlet. In the exemplary embodiment illustrated in FIGURES 3, 4 and 5, the feed device comprises a pair of rotary members 106 having a plurality of flexible fingers 108 projecting radially outwardly therefrom, which overlie a portion of the upper projecting surface of the lower frame 56. The rotary members 106 are supported on vertically disposed shafts 110, each of which is journaled in a C-shaped bracket 112 mounted on each side of the forward end of the platform 44. Rotation of the rotary members and the flexible fingers 108 thereon in a direction as illustrated by the arrows in FIGURE 4, effecting a sweeping of fruit toward the inlet I, is achieved by means of a driven pulley 114 affixed on each of the shafts 110, around which a drive belt 116 is trained. The drive belt 116 extends rearwardly, as best seen in FIGURE 4, and is disposed in frictional engagement around drive pulleys 118 mounted on the drive shaft 80.

Rotation of the feed devices, as well as each of the V-belts 88 on the upper and lower frames, is achieved by a drive motor 120, as best seen in FIGURES 2 and 4, which is drivingly coupled to a gear reducer 122 having its output shaft drivingly connected to the projecting end of the drive shaft 80. The transmission of power to the drive shaft 78 on the upper frame is accomplished by a drive gear 124, as best seen in FIGURE 3, which is disposed in constant meshing relationship with an idler gear 126, which in turn meshes with idler gear 128, which is in constant meshing engagement with a driven gear 130 affixed to the drive shaft 78. The drive gear 124, having its center coinciding with that of the drive shaft 80 about which the upper frame pivots, remains in constant meshing engagement with the idler gear 126, maintaining continuity of power transfer regardless of the pivoted position of the upper frame relative to the lower frame. The motor 120 is preferably of a reversible type to enable a change in the direction of travel of the continuous belts ot a direction outwardly of the inlet I, so as to enable release of any branches or other objects which may inadvertently become entrapped within the picking head during a picking operation.

In normal operation, the drive motor reducer transfer torque to the drive shaft 80 so as to effect rotation thereof in a clockwise direction as viewed in FIGURE 3, effecting a linear travel of the opposing flights 92 on the lower frame inwardly of the inlet I, or toward the right. The rotation of the drive shaft 80 effects concurrent rotation of the drive pulleys 118 and movement of the drive belts 116 trained therearound, effecting a rotation of the rotary members 106 and flexible fingers thereon in a direction to sweep fruit toward the inlet I. Through the gear arrangement comprising drive gear 124, idler gears 126 and 128 and driven gear 130, the upper shaft 78 is driven in a counterclockwise direction as viewed in FIGURE 3, wherein the opposing flight on the upper frame 54 moves inwardly of the inlet I and also toward the right. The ratios of the gear train interconnecting the shafts 80 and 78 is controlled so that the lower flights 92 travel at a linear speed greater than the upper flights. This causes a concurrent linear inward travel of rounded fruit engaged between the opposed flights in addition to a rotary movement which simulates the pull and twist applied to fruit during a manual picking operation.

The composite linear and rotary movement imparted to fruit in accordance with the foregoing arrangement is schematically illustrated in FIGURE 9. As shown, a piece of fruit, indicated at A, is positioned on the upper surface of the projecting lower frame 56 and is advanced toward the inlet I by means of a flexible finger 108 of the feeding device. The fruit, while still connected to the branch by its stem, advances in a substantially linear manner until it is engaged between the opposing flights 90 and 92, whereupon a rotary movement is imparted thereto. This is exemplified by the arrows indicated on the fruit shown at B in FIGURE 9. The upper flight 90, moving at a linear speed less than the lower opposing flight 92, causes the fruit to rotate in a counterclockwise direction, while at the same time moving inwardly of the picking apparatus and toward the right as viewed in FIGURE 9. The combination of the tension and twist applied to the stem S effects a disengagement of the stem at is point of connection to the fruit, whereupon the stem S and supporting branch withdraw from the inlet I of the picking head and the fruit continues its travel to the position at C and eventually to D, after which it is discharged from between the engaging flights through a suitable chute into a storage or packing receptacle.

Figure 10:
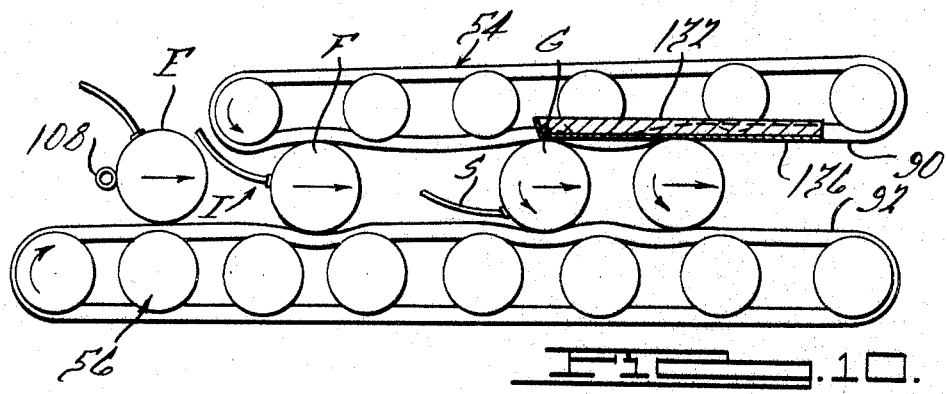
FIGURE 10 is a schematic side elevational view similar to FIGURE 9 but further illustrating the inclusion of a resiliently-biased stationary shoe disposed between the flights on the upper frame of the picking head.
Figure 11:
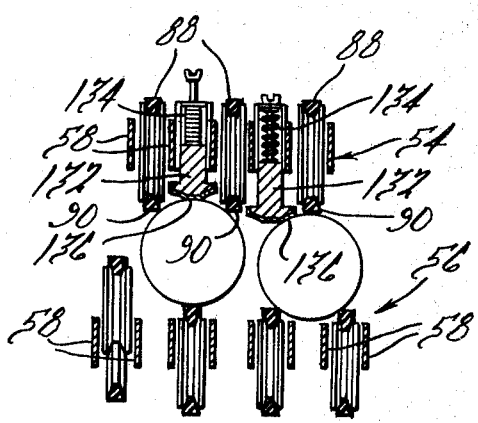
FIGURE 11 is a transverse sectional view of the picking head and the stationary shoes shown in FIGURE 10, and taken substantially along the line 11—11 thereof.

In accordance with an alternative embodiment, it is further contemplated that a stationary shoe 132 can be employed along a portion of the length of the upper frame 54, as best seen in FIGURES 10 and 11, for accelerating the degree of rotation of the fruit passing inward of the picking head. The shoe 132 is disposed stationarily between adjacent flights 90 of the upper frame 54 and is disposed in spaced relation with respect to the inlet I. In a specific embodiment, as illustrated in FIGURE 11, wherein the upper frame 54 comprises three spaced-apart V-belts 88, two stationary shoes 132 are employed which are disposed between and extend substantially parallel with respect to the lower flights 90 thereof and are resiliently biased by means of coil springs 134 to provide vertical deflection so as to accommodate fruits of different diameter. The lower opposing surface of each stationary shoe 132 is provided with a suitable frictionally-engaging lining 136 so as to better engage the peripheral portion of the rounded fruit, minimizing relative slippage and imparting an accelerated rolling action thereto. The utilization of a stationary shoe is primarily for the purpose of assuring disengagement of the fruit from its stem in the event the fruit has traveled inwardly of the inlet I of the picking head and the tension and twist applied to the fruit has not been enough to effect disengagement thereof. Accordingly, when the fruit is engaged by the stationarily disposed shoe 132, the rotary movement thereof in a clockwise direction, as viewed in FIGURE 10, is increased from that which occurred while the fruit was engaged by the upper flight 90 imparting increased twist, thereby accelerating a rupture of the stem at its point of connection to the fruit.

This sequence is schematically illustrated in FIGURE 10 wherein a piece of fruit indicated at E is advanced toward the inlet I by means of a flexible finger 108 and commences to rotate on coming to a position as illustrated at F. Further travel of the fruit with the stem S still engaged causes the fruit to attain a position indicated at G, at which the upper surface contacts the friction lining 136 of the stationary shoe 132, causing the fruit to rapidly accelerate in its rotation, assuring a severing of the stem and fruit. Thereafter, the fruit travels to a position such as H and eventually is discharged from the right-hand side of the picking head assembly to a suitable receptacle.

Figure 12:
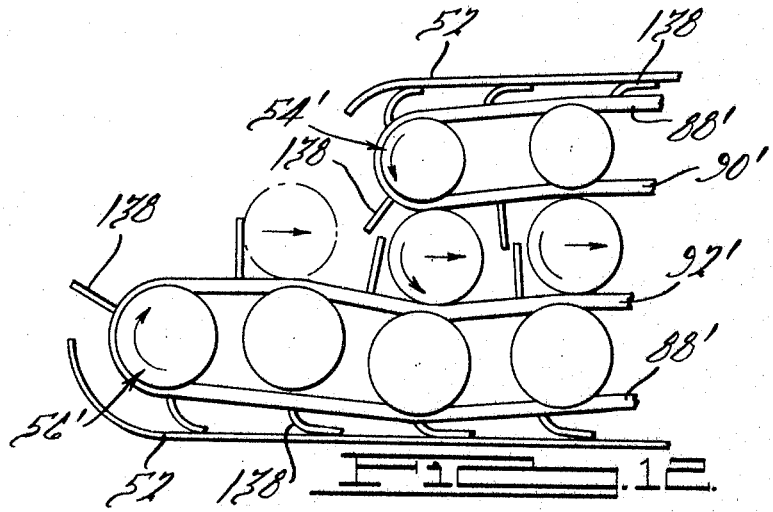
FIGURE 12 is a fragmentary side elevational view illustrating an alternative embodiment of feed means on the continuous flexible belts for facilitating engagement of fruit by the picking head.

In accordance with still another embodiment of a feeding device for a picking head comprising the present invention, the flexible belts are provided with a plurality of flexible fingers which are adapted to engage the fruit in the overhanging region of the lower frame, effecting an advancement thereof into an engaged position between the opposing flights of the upper and lower frames. This embodiment is illustrated in FIGURE 12. As shown, the V-belt 88′ on the upper frame 54′ is provided with a plurality of flexible fingers 138 which project outwardly thereof and are retained in a bent trailing position while disposed in contact with the shroud 52 disposed above the frame. Similarly, the V-belt 88′ of the lower frame 56′ is formed with a plurality of flexible fingers 138 disposed at longitudinally-spaced increments therealong, which similarly are deflected into a trailing position during their movement while in contact with the inner surface of the shroud 52. Upon emergence from the upper and lower shrouds 52, the flexible fingers 138 return to their substantially straight, outwardly projecting position in which they engage a rounded piece of fruit, as indicated in phantom, disposed on the forward projecting portion of the lower frame 56′ moving it toward the inlet I of the picking head. The fruit thereafter, as shown in phantom, becomes engaged by the opposing flights 90′, 92′ of the upper and lower frames respectively, whereupon a linear and rotary movement is imparted thereto in a manner as previously described.

Figure 13:
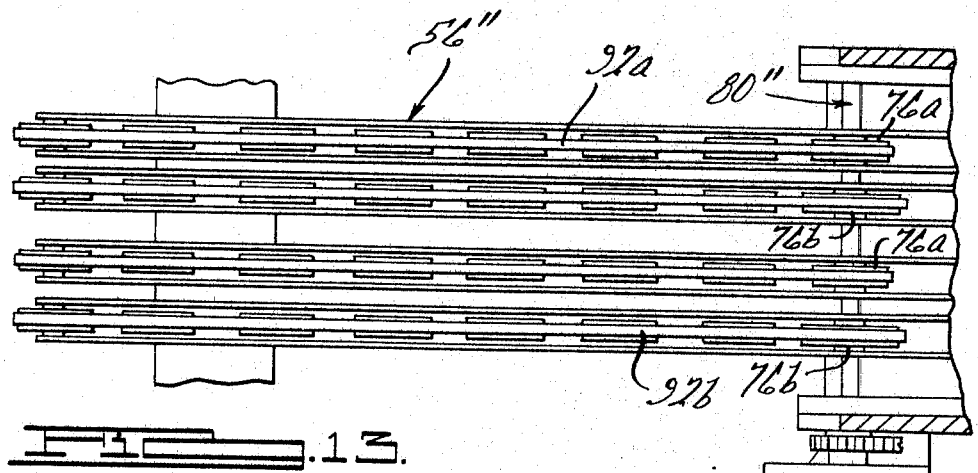
FIGURE 13 is a fragmentary plan view of the lower frame of the picking head illustrating means for effecting different speeds of travel of alternate ones of the belts.

In accordance with still another embodiment of the present invention, the linear speed of travel of adjacent flights on one or both frames is varied so as to effect a composite rotary movement of the fruit, still further facilitating a disengagement thereof from its stem. A typical arrangement for achieving a controlled variation in the linear speed of travel of adjacent flights on one or both frames is illustrated in FIGURE 13. As shown in the drawing, the lower frame 56″ is driven by the drive shaft 80″ on which drive pulleys 76a and 76b are alternatively mounted. The drive pulleys 76a, 76b are identical in all respects to the drive pulleys 76 as previously described in connection with FIGURE 8, but are of different diameters thereby imparting a different speed of travel to the flexible belts driven thereby. Accordingly, flights 92a of the lower frame 56″ travel at a slower speed than adjacent flights 92b imparting a rotary movement to the fruit about an upright axis, as well as about the horizontal axis previously described, in response to the coaction of the upper opposing flight or stationary shoe.

Figure 14:
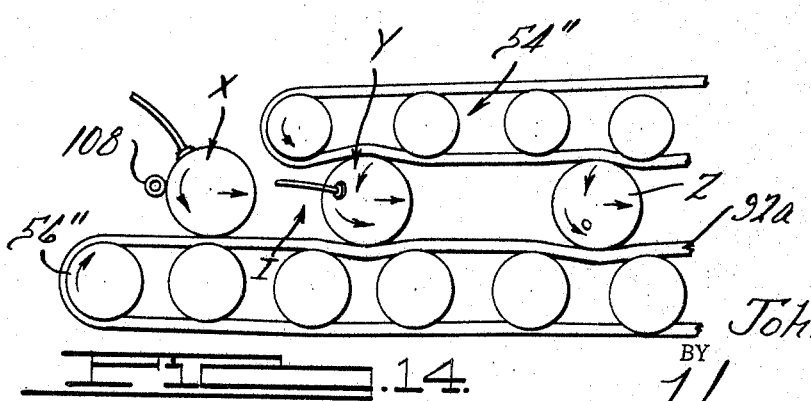
FIGURE 14 is a fragmentary schematic side elevational view illustrating the composite linear and rotary movement of a rounded piece of fruit passing inwardly between the opposed flights of a picking head incorporating the embodiment of FIGURE 13.

A typical sequence of the movement of a piece of fruit in accordance with the arrangement as shown in FIGURE 13 is schematically illustrated in FIGURE 14. As shown, a piece of fruit is advanced toward the inlet I by a flexible finger 108 of the feeding device mounted adjacent to the projecting forward end of the lower frame 56″. The fruit upon moving from the position indicated at X to the position indicated at Y becomes disposed in frictional engagement between the upper opposing flights 90″ of the upper frame 54″ and adjacent lower flights 92a, 92b traveling at different speeds from each other and different from the linear speed of travel of the lower flight 90″ on the upper frame. The coaction of the three frictionally-engaging flights imposes a concurrent linear travel of the fruit toward the right as viewed in FIGURE 14 and a rotation thereof about a plurality of axes as indicated by the arrows on the fruit further imposing severing stresses to the connection between the fruit and stem. Upon severance of the stem from the fruit, it continues to travel toward the right to a position indicated at Z, and thereafter passes outwardly of the rearward end of the picking head in a manner as previously described.

It will be appreciated that adjacent flights of the upper frame can similarly be controlled to travel at different speeds from each other and from the linear speeds of the opposing flights of the lower frame, assuring that regardless of the triangular engagement of a piece of fruit between three flights of the picking head, a composite rotary movement, as well as linear movement, will be imparted thereto, substantially facilitating the severing of the fruit from its stem.

While it will be apparent that the preferred embodiments of the invention disclosed are well calculated to fulfill the objects above stated, it will be appreciated that the invention is susceptible to modification, variation and change.

What is claimed is:

1. A harvesting apparatus for picking fruit from a plant comprising a framework having a picking head mounted thereon, said picking head comprising a first frame and a second frame disposed in spaced overlying relationship, a plurality of endless belts arranged with one of each of the flights of said belts extending longitudinally from the forward ends of and along the opposed surfaces of said frames in spaced substantially parallel relationship and with the flights on said first frame laterally offset from the opposing said flightes on said second frame, said flights defining therebetween repetitive triangularly arranged fruit engaging and conveying channels, drive means for moving the opposed said flights in a direction inwardly from said forward ends of said frames and at different linear speeds imparting a composite linear and rotary movement to fruit engaged therebetween, and means for moving said head to a position in which the inlet thereof as defined by the forward ends of said frames is contiguous to fruit to be picked.

2. The harvesting apparatus as defined in claim 1 further including auxiliary feed means for engaging and advancing fruit into said inlet for engagement by said flights.

3. The harvesting apparatus as defined in claim 2 wherein said auxiliary feed means comprise a plurality of resilient projections affixed to said belts at spaced intervals therealong and projecting on opposed relationship toward the opposed flights on said first and said second frames.

4. The harvesting apparatus as defined in claim 2 wherein said auxiliary feed means comprise a pair of rotary members mounted on one of said frames adjacent to said inlet, a plurality of flexible fingers affixed to and projecting radially of said rotary members, and means for rotating said rotary members in a direction wherein said flexible fingers thereon are operative to engage and advance fruit into said inlet.

5. The harvesting apparatus as defined in claim 1 wherein alternative ones of said flights of said belts on one of said frames travel at different linear speeds than the next adjacent flights and the opposed said flights on the other frame.

6. The harvesting apparatus as defined in claim 1 wherein alternative ones of said flights of said belts on said first and said second frame travel at different linear speeds than the next adjacent flights and the opposed said flights on the opposed said frame.

7. The harvesting apparatus as defined in claim 1 wherein said forward end of said first frame is longitudinally offset from said forward end of said second frame.

8. The harvesting apparatus as defined in claim 1 wherein each said flight is resiliently supported by a plurality of longitudinally spaced rollers mounted on said frames in a manner to resiliently bias the opposed said flights toward each other.

9. The harvesting apparatus as defined in claim 1 further including a stationarily mounted shoe on said first frame extending longitudinally of and between said flights thereon from a position spaced inwardly of said forward end of said first frame toward the rearward portion thereof, said shoe including a face projecting in opposed relationship toward said flights on said second frame for engaging the periphery of fruit conveyed therealong.

10. The harvesting apparatus as defined in claim 1 wherein said first and said second frame are mounted on said framework by means providing for variable spacing between the opposed faces of said first and said second frame.

References Cited

UNITED STATES PATENTS

| | | | |
|---|---|---|---|
| 2,402,201 | 6/1946 | Martin | 56—328 |
| 2,499,693 | 3/1950 | Stanton | 56—328 X |
| 2,535,542 | 12/1950 | Lehman et al. | 56—328 |
| 2,968,141 | 1/1961 | McGough | 56—332 |
| 3,143,844 | 8/1964 | Polk | 56—328 |
| 3,161,007 | 12/1964 | Bergquist | 56—332 |

ROBERT PESHOCK, Primary Examiner

PASQUALE A. RAZZANO, Assistant Examiner